United States Patent [19]

Cain et al.

[11] 4,047,768
[45] Sept. 13, 1977

[54] PROTECTED BEARING MOUNT ASSEMBLY

[75] Inventors: Earl S. Cain, Portola Valley; Jerome A. Carlson, Woodside; George E. Goodrich, San Carlos, all of Calif.

[73] Assignee: Tribotech, Redwood City, Calif.

[21] Appl. No.: 670,441

[22] Filed: Mar. 25, 1976

[51] Int. Cl.² ............................................. F16C 11/06
[52] U.S. Cl. ........................................ 308/72; 308/15
[58] Field of Search ........................... 308/72, 15

[56] References Cited
U.S. PATENT DOCUMENTS 1,894,309  1/1933  Flumerfelt .................. 308/72
Re. 24,765  1/1960  White ....................... 308/72

*Primary Examiner*—Richard A. Bertsch

[57] ABSTRACT

A protected bearing mount assembly in which the bearing mount comprises a bearing mounting flange extending from one face of a plate and in which the outer portions of the plate are bent in the same direction as the bearing mounting flange to surround, support and protect the flange together with a cover on the open end of the bearing mount to protect the mounted bearing against the environment to which the bearing mount is exposed.

8 Claims, 7 Drawing Figures

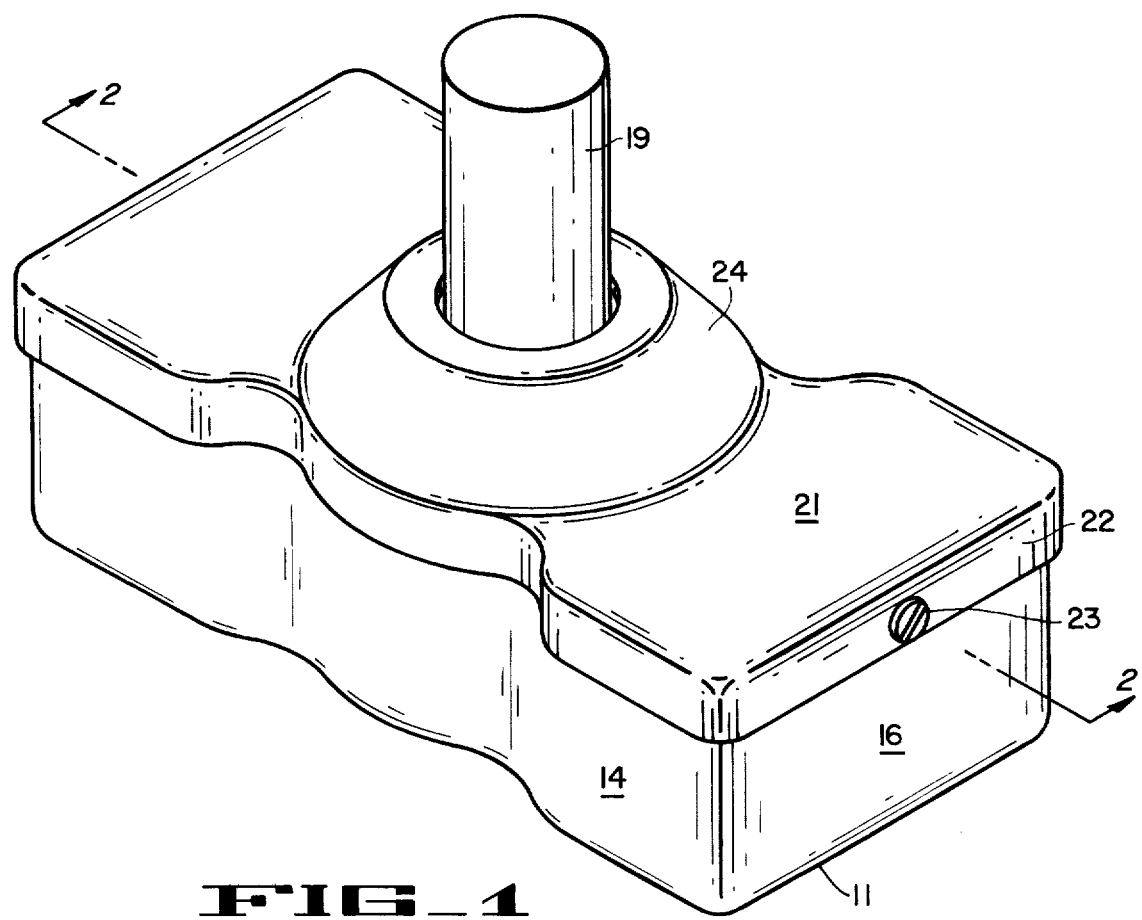
FIG_1
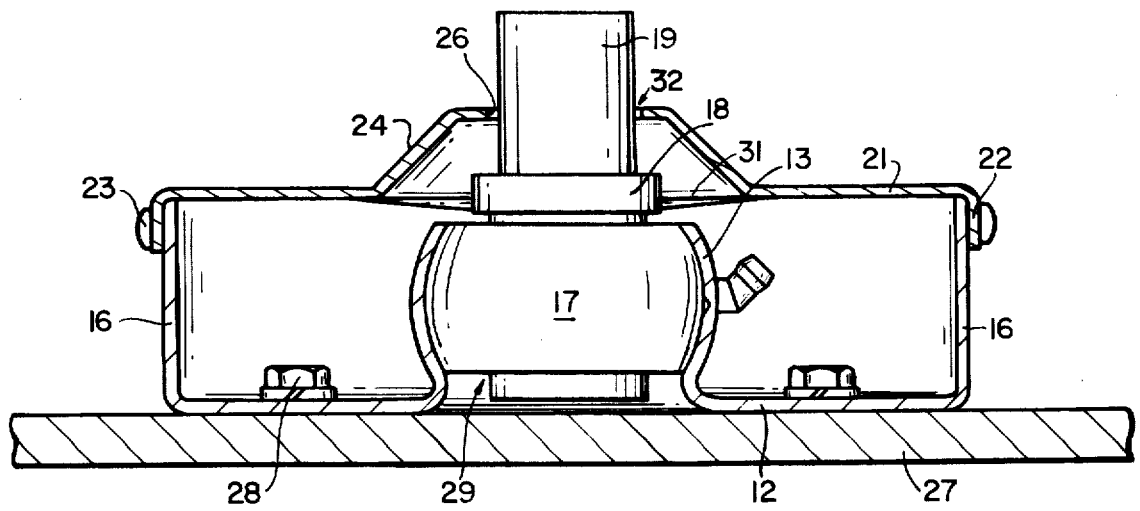
FIG_2

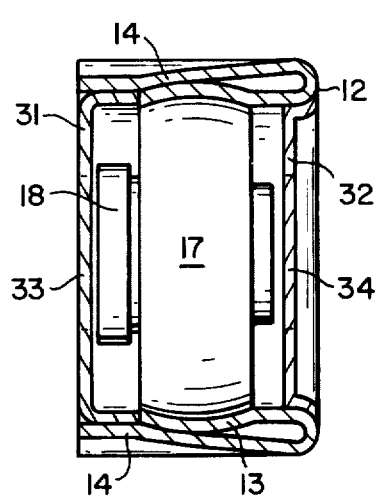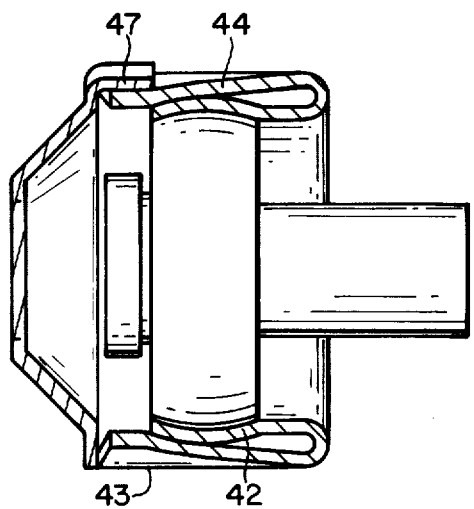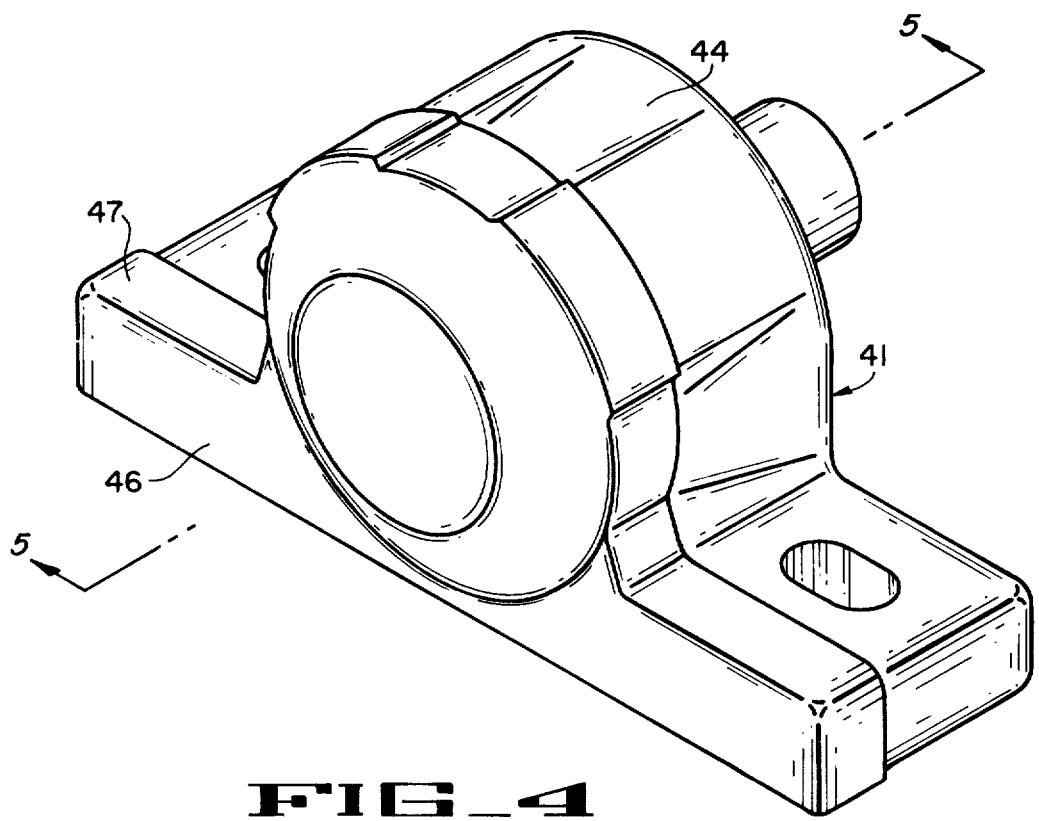

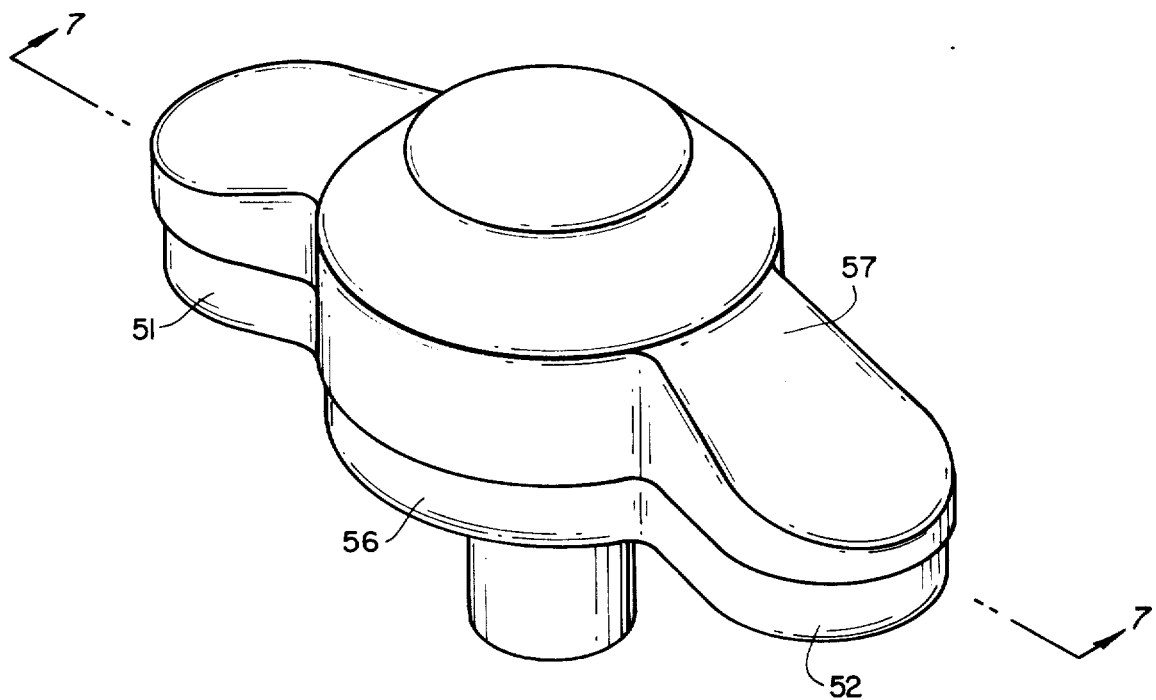
FIG_6
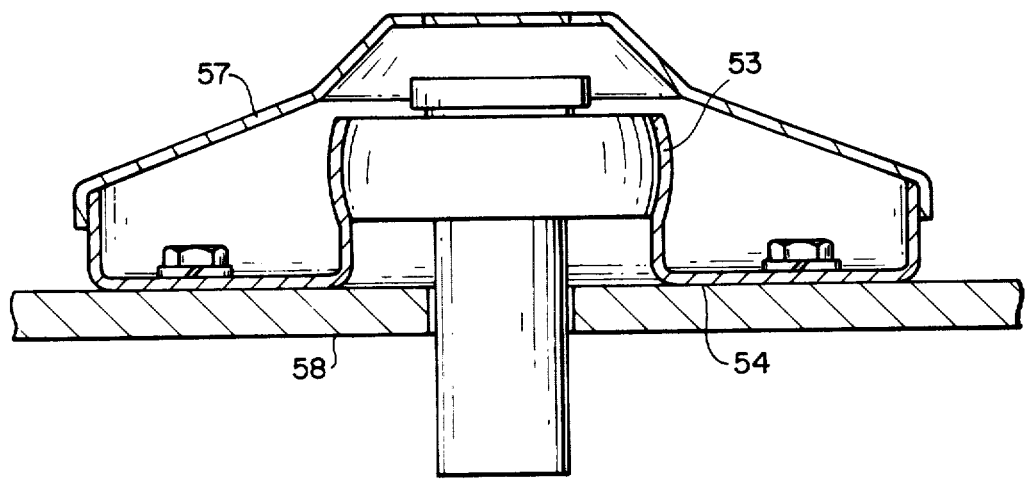
FIG_7

PROTECTED BEARING MOUNT ASSEMBLY

REFERENCE TO RELATED APPLICATIONS

In our copending application entitled "Bearing Mount", Ser. No. 492,214, filed July 26, 1974, now U.S. Pat. No. 3,966,275 there is described a box-like structure formed from a single plate of material with a bearing mounting flange extending from one surface and the edges of the plate being formed to extend in the same direction as the flange to surround the flange and form a box-like structure which encloses the flange and mounted bearing. There is described and shown, but not claimed, in said application suitable shields and plugs which serve to protect the mounted bearing during shipping, storage and use. The present application is a continuation in part of said copending application directed to the protected bearing mount assembly.

In our copending application entitled "Flange Mount", Ser. No. 664164, filed Mar. 5, 1976, there is described a one-piece formed metal flange mount in which a bearing mounting flange extends from one surface of the plate and the outer edges of the plate are formed to extend in the same direction as the bearing mounting flange to surround the bearing mounting flange.

In our copending application entitled "Pillow Block", Ser. No. 664163, filed Mar. 5, 1976, there is described a one-piece formed metal pillow block which likewise includes a bearing mounting flange extending from one face of a plate of material and with the outer edges of the plate being formed to extend in the same direction as the flange to enclose and protect the same and also provide a mounting surface for the pillow block.

BACKGROUND OF THE INVENTION

This invention relates generally to bearing mounts and more particularly to a bearing mount in which the mounted bearing and also, mounting bolts and lubrication fittings, if any, are protected from the environment to which it is subjected.

In conventional mounted bearing assemblies, the bearing is subjected directly to the environment and is protected solely by a shield or seal which forms part of the bearing itself. In industrial and agricultural uses, there is a build-up of the environmental debris such as cuttings, dust, dirt and the like and the shield or seal is subjected to pressure as the debris builds up. In due time the seal may be broken and the debris reaches inside the bearing. Once the debris reaches the bearing, there is a rapid wear-out of the bearing. Additionally, the mounting bolts or nuts and lubrication fittings, if any, are protected from wear and contamination.

OBJECTS AND SUMMARY OF THE INVENTION

It is a general object of the present invention to provide a bearing mount in which the bearing is protected from the environment to which it is subjected by a separate cover.

It is another object of the present invention to provide a bearing mount in which the bearing is housed within a closed and spaced surrounding structure having an open end covered by a protective plate or cover.

The foregoing and other objects of the invention are achieved by a bearing mount assembly including a bearing mounting flange extending from one surface of a plate with the edges of the plate being formed to extend in the same direction as the flange and surrounding the flange to enclose or house the same, a bearing is mounted in said bearing mounting flange, and a cover is secured to and closes the open end of the mount to protect the mounted bearing.

BRIEF DESCRIPTION OF THE DRAWING

FIG. 1 is a perspective view of a universal bearing mount with protected bearing.

FIG. 2 is a sectional view taken along the line 2—2 of FIG. 1.

FIG. 3 is a sectional view of a universal bearing mount with another design of protective cover.

FIG. 4 is a perspective view of a pillow block including a protective cover to form a protected bearing assembly in accordance with the invention.

FIG. 5 is a sectional view taken along the lines 5—5 of FIG. 4.

FIG. 6 is a perspective view of a flange mount cover to form a protected bearing assembly in accordance with the invention.

FIG. 7 is a sectional view taken along the line 7—7 of FIG. 6.

BRIEF DESCRIPTION OF PREFERRED EMBODIMENTS

Referring to FIGS. 1 and 2, there is shown a protected bearing mount assembly in accordance with the present invention and including a bearing mount of the type disclosed in said copending application, Ser. No. 492,214. The bearing mount includes a unitary box-like structure 11 which may be formed from sheet metal by stamping or pressing. The mount includes a flange plate 12, the original sheet metal with a bearing mounting flange 13 extending from one face of the flange plate as shown in FIG. 2. The outer portions of the plate are formed to extend in the same direction as the flange to provide sides 14 and ends 16. A bearing 17 is shown mounted in the bearing flange 13 with locking collar 18 which locks the inner race to the shaft 19. In accordance with the present invention, the open end of the box-like structure 11 is provided with a cover 21 which includes a lip 22 extending over the sides and ends of the box-like structure. The cover is suitably secured to the box-like bearing mount structure as by screws 23. The portion of the cover 21 adjacent the bearing is domed as shown at 24 whereby it is spaced a substantial distance from the associated bearing. Shaft 19 is shown extending into the bearing and through the opening 26 formed in the cover 21. The flange plate 12 is shown secured to support 27 by bolts 28. As a result the adjacent end 29 of the bearing is protected. The opposite end 31 of the bearing is subjected to debris which may enter through the space 32 between the shaft 19 and cover 21. However, the space may be made relatively small and with a cover mounted, the atmospheric pressure within the box-like mount will prevent dirt from easily entering into the box-like mount. Furthermore, any large particles, wire or other debris cannot enter through the small opening 32 to directly strike the bearing. Rather, such debris will strike the cover 21 and be deflected therefrom. Thus, it is only fine particles which enter through the gap between the shaft and the associated cover. When the bearing mount is located vertically, the debris will flow through the openings and will accumulate within the box. Preferably an opening is formed on the lower side of the box and the material falls out under gravitational forces.

Referring to FIG. 3, there is shown a bearing mount with like reference numerals applied to like parts. However, rather than providing a cover with lips, the cover is formed so that it extends inside of the sides 14 and 16, as shown by the cover 31, FIG. 3. The cover is accommodated by and frictionally held within the bearing mount to protect the bearing 17 mounted in the bearing flange 13. A plug 32 may be provided at the other end to protect the bearing. With the cover and plug closed as shown, they serve to protect the bearing during shipping and the like. The plugs may include knock-outs 33 and 34 to accommodate a shaft. The cover and plug protect the bearing in the manner previously described.

In FIG. 4 there is shown a pillow block 41 formed from a sheet or plate. The pillow block includes a bearing mounting flange 42 extending from one surface of the sheet. The outer edges are formed to extend in the same direction as the flange to form a mounting base 43 and surrounding sides 44. The pillow block is described in greater detail in the copending application for pillow block, referred to above. The open end of the pillow block is provided with a cover 46 which is suitably secured to the mount by means of screws which engage the lip 47. The lip does not extend over the mounting base 43.

Referring to FIGS. 6 and 7, there is shown a flange mount of the type described in the copending application entitled "Flange Mount", referred to above. The flange mount shown includes two mounting flange sections 51 and 52 with bearing mounting flange 53 extending from one face of the mounting plate 54 and with sides 56 surrounding and protecting the bearing mounting flange 53. A cover 57 fits over the open end of the flange mount to protect the bearing. The cover is solid since the shaft extends through the close clearance sealing opening formed in the mounting plate 58.

Thus, it is seen that there are provided bearing mounts of the universal type, that is, a bearing mount which can serve as a flange, pillow block or take-up mount for self-aligning bearings as well as pillow block bearing mounts and flange bearing mounts, all of which are formed from sheet or plate metal. The open ends are provided with a cover to protect the mounted bearing, mounting bolts or nuts and lubrication fittings against debris which may be present under the environment in which the mounted bearings are used.

What is claimed is:

1. A protected bearing mount assembly including a bearing mounting flange extending from one surface of a plate with the outer edges of the plate being formed to extend in the same direction as the flange and surrounding the flange, a bearing mounted in said bearing mounting flange and a cover secured to the outer extending edges of said plate to enclose the bearing mounting flange and one end of the bearing between said cover and said plate.

2. A protected bearing mount assembly as in claim 1 in which said bearing mount comprises a box-like structure adapted to be mounted on any of its sides or on its face.

3. A protected bearing mount as in claim 2 including a plug cover inserted within the bearing mounting flange on the side opposite the cover to enclose the opposite end of the bearing.

4. A protected bearing mount assembly as in claim 1 in which said bearing mount is a flange mount.

5. A protected bearing mount as in claim 4 including a plug cover inserted within the bearing mounting flange on the side opposite the cover to enclose the opposite end of the bearing.

6. A protected bearing mount assembly as in claim 1 in which said mount is a pillow block.

7. A protected bearing mount as in claim 6 including a plug cover inserted within the bearing mounting flange on the side opposite the cover to enclose the opposite end of the bearing.

8. A protected bearing mount as in claim 1 including a plug cover inserted within the bearing mounting flange on the side opposite the cover to enclose the opposite end of the bearing.

* * * * *